United States Patent Office 3,475,519
Patented Oct. 28, 1969

3,475,519
TRANSPARENT BLENDS OF POLYALKYL METHACRYLATES WITH RUBBERY EPICHLOROHYDRIN POLYMERS
James Sterling Noland, Greenwich, and Robert Saxon, Stamford, Conn., assignors to Formica Corporation, Cincinnati, Ohio, a corporation of Delaware
No Drawing. Filed Dec. 20, 1966, Ser. No. 603,174
Int. Cl. C08g *43/02*
U.S. Cl. 260—901                                    8 Claims

ABSTRACT OF THE DISCLOSURE

Compositions of matter comprising a blend of (A) a polymer of a monomer having the formula $$CH_2=C(CH_3)-C(=O)-OR$$

wherein R is an alkyl radical of 1–3 carbon atoms, inclusive, and (B) a homopolymer of epichlorohydrin or copolymers of epichlorohydrin and an alkylene oxide, are disclosed.

---

The blending of one resin system with one or more other resin systems have been known for many years. Many of such resins have been blended with one another to give clear compositions of excellent extensibility. Acrylic polymers, however, have not been so modified due to the fact that most resin systems are not molecularly compatible therewith in all concentrations and the resultant blends therefore suffer from deficiencies such as opacity, low impact strength, low extensibility etc. Furthermore, various materials such as dibutyl phthalate, etc. when blended with poly(methyl methacrylate), for example, result in soft, weak materials which are, for the most part, useless in most commercial applications. It was therefore previously necessary to copolymerize the methacrylate monomer with a sufficient amount of at least one comonomer copolymerizable therewith in order to produce a methacrylate product having the desired properties.

We have now found that epichlorohydrin polymers can be blended with methacrylate polymers to produce optically transparent, high impact compositions which have excellent extensibility and freedom from stress whitening. These unique properties are achieved since the two resin systems are molecularly compatible, a result which is entirely unexpected in view of known resin/rubber blends. Our novel compositions possess the ability to be molded into various articles of manufacture which are transparent and free of stress-whitening. Such characteristics could only be produced before by exacting and tedious methods wherein refractive index matching and other critical manipulative treatments were necessary.

As mentioned above, we achieve our novel results by blending the methacrylate polymer with poly(epichlorohydrin) or its alkylene oxide copolymers. Examples of methacrylate polymers which may be used include homopolymers and copolymers of ethyl methacrylate, methyl methacrylate, propyl methacrylate and the like.

Comonomers which may be used, in amounts up to about 20%, with said methacrylate monomers include such monomers as the unsaturated alcohol esters, more particularly the allyl, vinyl, butenyl, etc., esters of saturated and unsaturated aliphatic and aromatic monobasic and polybasic acids such, for instance, as acetic, propionic, crotonic, oxalic, malonic, succinic, adipic, maleic, fumaric, itaconic, benzoic, phthalic, etc., acids; the saturated monohydric alcohol esters, e.g., the methyl, ethyl, propyl, etc., esters of ethylenically unsaturated aliphatic monobasic and polybasic acids, illustrative examples of which appear above; unsaturated ethers, e.g., ethyl vinyl ether, diallyl ether, etc.; unsaturated amides, for instance, acrylamide, and N-substituted acrylamides, e.g., N-methylol acrylamide, unsaturated ketones, e.g., methyl vinyl ketone, etc.; ethylene; acrylates such as methyl acrylate, ethyl acrylate etc.; vinyl halides, such as vinyl chloride, including vinylidene halides such as vinylidene chloride, vinylidene fluoride and the like.

Among the comonomers which are preferred for use in carrying our invention into effect are, for example, compounds such as acrylonitrile; the various substituted acrylonitriles (e.g., methacrylonitrile, ethacrylonitrile, phenylacrylonitrile, etc.), vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, the various poly-substituted styrenes such, for example, as the various di-, tri-, and tetra-chlorostyrenes, -bromostyrenes, -fluorostyrenes, -methylstyrenes, -ethylstyrenes, etc.; vinyl naphthalene, vinyl pyridine, divinyl benzene, trivinyl benzene, allyl benzene, diallyl benzene, etc.

Other monomers copolymerizable with the alkyl methacrylates are given, for instance, in United States Patent No. 2,601,572, dated June 24, 1952, where examples are given both by classes and species.

Of course, it is also possible to utilize copolymers produced from two or more of the monomers represented by Formula I, above, and still obtain the benefits heretofore set forth.

The epichlorohydrin homopolymers and alkylene oxide copolymers thereof are well known in the art and are available commercially. The homopolymer can be produced by polymerizing epichlorohydrin with, for example, organoaluminum catalysts. Examples of alkylene oxides with which the epichlorohydrin may be copolymerized under known reaction conditions include ethylene oxide, propylene oxide, butene oxide, cyclohexene oxide, vinyl cyclohexene oxide, 1-hexene oxide, trifluoromethyl ethylene oxide, perfluoropropylene oxide, perfluoroethylene oxide, 1,4-dichloro-2,3-epoxy butane and the like. The alkylene oxides are copolymerized with the epichlorohydrin in amounts up to about 50%, by weight. Further discussions of such polymers and methods for their preparation can be found in U.S. Patent Nos. 3,186,958 and 3,026,270, which references are hereby incorporated herein by reference.

In general, the epichlorohydrin homopolymer is composed of recurring units of the formula $$-[CH(CH_2Cl)-CH_2-O]_n-$$

wherein $n$ is the number of recurring units, and the epichlorohydrin/alkylene oxide copolymers are composed of recurring units of the formula $$-[CH(CH_2Cl)-CH_2]_x-[O-R^1-O]_y-$$

wherein $R^1$ is an alkylene radical and the ratio of $x:y$ ranges from about 1000:1 to 1:10, respectively. The epichlorohydrin polymers are generally elastomeric in nature. They are impermeable to gases and have a high resistance to solvents, fuels and oils. They are easily fabricated and are thermally stable.

The epichlorohydrin polymers may be blended with the methacrylate polymers in concentrations ranging from about 1%–95%, preferably about 5%–75%, by weight, based on the total weight of the blend.

The polymer systems may be blended with one another by any known technique, as solids, solutions or the like. For example, blending may be effected by the use of rubber mills, banbury mixes, sigma mixes, hot rolls, devolatilizer-extruders and the like.

The molecular weights of the methacrylic and epichlorohydrin polymers are not critical however, it is generally preferred that polymers of high molecular weight, i.e. over 100,000 be used.

The compositions of the instant invention may be modified by the addition thereto of dyes, pigments, stabilizers, inhibitors, fillers, etc. in concentrations known to those skilled in the art without detracting from the scope of the instant invention.

Our novel compositions may be used as surface coatings for decorative laminates, packaging, molding compounds or additives to other resin systems.

The following examples are set forth for purposes of illustration only and are not to be construed as limitations on the instant invention except as set forth in the appended claims. All parts and percentages are by weight unless otherwise specified.

EXAMPLE I 325 parts of a copolymer of methyl methacrylate and ethyl acrylate (95/5) (molecular weight—100,000) are fluxed on a two roll, chrome plated mill at 320° F. for 5 minutes. The steam is then turned off, and the back roll is cooled by introducing water. 175 parts of a commercially available, amorphous epichlorohydrin-ethylene oxide rubbery copolymer (50/50) having a specific gravity of 1.27 are milled into the fluxed methacrylate copolymer. Milling is continued for eight minutes, and then the resultant blend is stripped from the rolls. The temperature of the mill rolls is 300° F. and 120° F. at the end of the eight minute period.

The blend is cut into about 1 inch pieces, while still warm, and is subsequently mixed with dry ice and ground in a chopper to produce a granular solid suitable for charging into an extruder.

Extrusion of the blend (barrel temp., 350° F., head temp., 400° F., melt pressure, 3500 p.s.i.) produces a clear film of excellent clarity and extensibility. The properties of this film are set forth in Table I, below.

EXAMPLE II

In the same manner described as in Example I, a blend of 75 parts homopolymeric methyl methacrylate and 25 parts of an amorphous, commercially available epichlorohydrin-ethylene oxide (75/25) copolymer are prepared. The extrusion, carried out in the same manner, produces a film of excellent clarity, but with slightly greater softness than the blend prepared in Example I. The properties of this film is also set forth in Table I, below.

The procedure of Example I was followed with (A) a 50/50 blend of poly(ethylmethacrylate) and the epichlorohydrin polymer of Example I; (B) a 50/50 blend of poly(n-propylmethacrylate) and the epichlorohydrin polymer of Example I; (C) a 25/75 blend of a methyl methacrylate/styrene (90/10) copolymer and polyepichlorohydrin having a specific gravity of 1.36; (D) a 95/5 blend of poly(methyl methacrylate) and an epichlorohydrin/propylene oxide (50/50) copolymer; and (E) a 50/50 blend of an ethyl methacrylate/ethyl acrylate (90/10) copolymer and an epichlorohydrin/propylene oxide (75/25) copolymer.

In each instance, films of the blends of the two materials were transparent and clear and showed a greater extensibility than the methacrylate polymer component alone. The glass transition temperature for compositions (A) and (B) are −9° C. and −24° C., respectively.

We claim:

1. A transparent composition of matter consisting essentially of a physical blend of (A) from about 5% to about 99%, by weight, of a polymer of a monomer having the formula

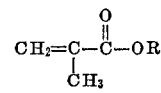

wherein R is an alkyl radical of 1–3 carbon atoms, inclusive, at least 80% of said polymer comprising said monomer, and (B) from about 1% to about 95%, by weight, of a rubbery polymer selected from the group consisting of polyepichlorohydrin and a copolymer of epichlorohydrin and an alkylene oxide, said copolymer having a ratio of epichlorohydrin to alkylene oxide of from about 1000:1 to 1:10.

2. A composition according to claim 1 wherein (A) is a polymer of methyl methacrylate.

3. A composition according to claim 1 wherein (A) is a polymer of ethyl methacrylate.

4. A composition according to claim 1 wherein (A) is a polymer of a propyl methacrylate.

5. A composition according to claim 1 wherein (B) is polyepichlorohydrin.

6. A composition according to claim 1 wherein (B) is a copolymer of epichlorohydrin and an alkylene oxide.

7. A composition according to claim 1 wherein (A) is a polymer of methyl methacrylate and (B) is poly(epichlorohydrin).

8. A composition according to claim 1 wherein (A) is a polymer of methyl methacrylate and (B) is a copolymer of epichlorohydrin and an alkylene oxide.

TABLE I

| Ex. | Composition | Glass Transition[b] Temp., °C. | Transparent | Tensile[a] strength, ×10³ p.s.i. | Tensile[a] Elongation, % | Tensile[a] modulus, ×10⁵ | Temp. of Tensile Test, °C. |
|---|---|---|---|---|---|---|---|
| 1 | 65% methacrylate polymer, 35% epichlorohydrin polymer | 31 | Yes | 1.4 yield / 6.1 yield | 4.7 yield / 5.8 yield | 0.07 / 0.20 | 23 / −20 |
| 2 | 75% methacrylate polymer, 25% epichlorohydrin polymer | 41 | Yes | 4.7 yield / 8.4 break | 3.9 yield / 3.2 break | 0.23 / 0.33 | 23 / −20 |
| 3 | 100% poly(methyl methacrylate) | 95 | Yes | 8.8 break | 2.9 break | 0.44 | 23 |

[a] Instron Tester; Strain rate 10%/min.; rel. humidity=50%.
[b] Measured by specific volume change (dilatometric measurement).

References Cited

UNITED STATES PATENTS 3,006,872  10/1961  Benedict et al. ____ 260—901 XR
3,058,951  10/1962  Flowers et al. ____ 260—901 XR
3,256,211   6/1966  Bailey et al. _____ 260—2

MURRAY TILLMAN, Primary Examiner

K. E. KUFFNER, Assistant Examiner

U.S. Cl. X.R.

260—836